(12) United States Patent
Dai et al.

(10) Patent No.: US 11,544,927 B2
(45) Date of Patent: Jan. 3, 2023

(54) VIDEO TYPE DETECTION METHOD AND APPARATUS BASED ON KEY FRAME, AND STORAGE MEDIUM

(71) Applicant: BEIJING BAIDU NETCOM SCIENCE TECHNOLOGY CO., LTD., Beijing (CN)

(72) Inventors: Bing Dai, Beijing (CN); Zhi Ye, Beijing (CN); Yangxi Li, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 130 days.

(21) Appl. No.: 17/124,542

(22) Filed: Dec. 17, 2020

(65) Prior Publication Data
US 2021/0192218 A1   Jun. 24, 2021

(30) Foreign Application Priority Data
Jun. 30, 2020   (CN) .......................... 202010617343.8

(51) Int. Cl.
  *G06V 20/40*   (2022.01)
(52) U.S. Cl.
  CPC .............. *G06V 20/41* (2022.01); *G06V 20/46* (2022.01); *G06V 20/48* (2022.01)
(58) Field of Classification Search
  None
  See application file for complete search history.

(56) References Cited

U.S. PATENT DOCUMENTS

| 8,311,277 B2 * | 11/2012 | Peleg ................... G06F 16/739 |
| | | 382/103 |
| 2012/0123978 A1 * | 5/2012 | Toderice ................ G06N 20/00 |
| | | 706/12 |
| 2019/0294889 A1 * | 9/2019 | Sriram ................. G06V 20/584 |

FOREIGN PATENT DOCUMENTS

| CN | 110334689 A | 10/2019 |
| CN | 111090776 A | 5/2020 |

OTHER PUBLICATIONS

European Search Report in EP Patent Application No. 21176585.4 dated Nov. 19, 2021.

* cited by examiner

*Primary Examiner* — Tahmina N Ansari
(74) *Attorney, Agent, or Firm* — Dilworth IP, LLC

(57) ABSTRACT

The present application discloses a video type detection method, apparatus, electronic device and storage medium. A specific implementation solution is as follows: obtaining N key frames of a first video, where N is an integer greater than 1, and a type of the first video is to be detected; obtaining M confidence scores corresponding to each of the N key frames by inputting each of the N key frames into M algorithm models corresponding to the first video type respectively, where M is an integer greater than 1; determining a confidence score of the first video by a fusion strategy algorithm model according to N×M confidence scores of the N key frames; and comparing the confidence score of the first video with a confidence score threshold corresponding to a first video type, to determine whether the type of the first video is the first video type or not.

20 Claims, 5 Drawing Sheets

VIDEO TYPE DETECTION METHOD AND APPARATUS BASED ON KEY FRAME, AND STORAGE MEDIUM

CROSS-REFERENCE TO RELATED APPLICATION

This application claims priority to Chinese Patent Application No. 202010617343.8, filed on Jun. 30, 2020, which is hereby incorporated by reference in its entirety.

TECHNICAL FIELD

Embodiments of the present application relate to the field of computer vision in the field of computer technologies, in particular, to a video type detection method, an apparatus, an electronic device and a storage medium.

BACKGROUND

With the continuous development of the Internet, more and more videos appear on the Internet. At the same time, there are some security risks. For example, some terrorists upload violent and terrorist videos to the Internet for publicity, which is likely to cause greater harm to social stability. Therefore, it is necessary to classify and filter sensitive videos in a large amount of videos, and establish a secure network environment.

SUMMARY

The present application provides a video type detection method, an apparatus, an electronic device and a storage medium.

According to a first aspect of the present application, a video type detection method is provided, including:

obtaining N key frames of a first video, where N is an integer greater than 1, and a type of the first video is to be detected;

obtaining M confidence scores corresponding to each of the N key frames by inputting each of the N key frames into M algorithm models corresponding to the first video type respectively, where M is an integer greater than 1;

determining a confidence score of the first video by a fusion strategy algorithm model according to N×M confidence scores of the N key frames; and comparing the confidence score of the first video with a confidence score threshold corresponding to a first video type, to determine whether the type of the first video is the first video type or not.

According to a second aspect of the present application, a video type detection apparatus is provided, including:

a first obtaining module, configured to obtain N key frames of a first video, where N is an integer greater than 1, and a type of the first video is to be detected;

a second obtaining module, configured to obtain M confidence scores corresponding to each of the N key frames by inputting each of the N key frames into M algorithm models corresponding to the first video type respectively, where M is an integer greater than 1;

a determination module, configured to determine a confidence score of the first video by a fusion strategy algorithm model according to N×M confidence scores of the N key frames; and a comparison module, configured to compare the confidence score of the first video with a confidence score threshold corresponding to a first video type, to determine whether the type of the first video is the first video type or not.

According to a third aspect of the present application, an electronic device is provided, including:

at least one processor; and a memory, connected with the at least one processor in communication; where, the memory stores instructions executable by the at least one processor, where the instructions are executed by the at least one processor to cause the at least one processor to perform the method described in the first aspect of the present application as mentioned above.

According to a fourth aspect of the present application, a non-transitory computer-readable storage medium storing computer instructions is provided, where the computer instructions are configured to cause a computer to perform the method described in the first aspect of the present application as mentioned above.

The technology according to the present application solves the problem about being prone to misjudgment when performing video type detection in the prior art, and improves the accuracy of video type detection.

It should be understood that the content described in this portion is not intended to identify key or important features of embodiments of the present application, nor is it intended to limit the scope of the present application. Other features of the present application will be easily understood by the following description.

BRIEF DESCRIPTION OF DRAWINGS

Drawings are used to better understand solutions of the present application, but do not limit the present application, in which.

DESCRIPTION OF EMBODIMENTS

The following describes exemplary embodiments of the present application in combination with the drawings. Various details of the embodiments of the present application are to facilitate understanding of the present application, and they shall be considered as merely exemplary. Therefore, those skilled in the art should realize that various changes and modifications can be made to the embodiments described herein without departing from the scope and spirit of the present application. Similarly, for the sake of clarity and conciseness, the description for well-known functions and structures is omitted in the following description.

Figure 1:
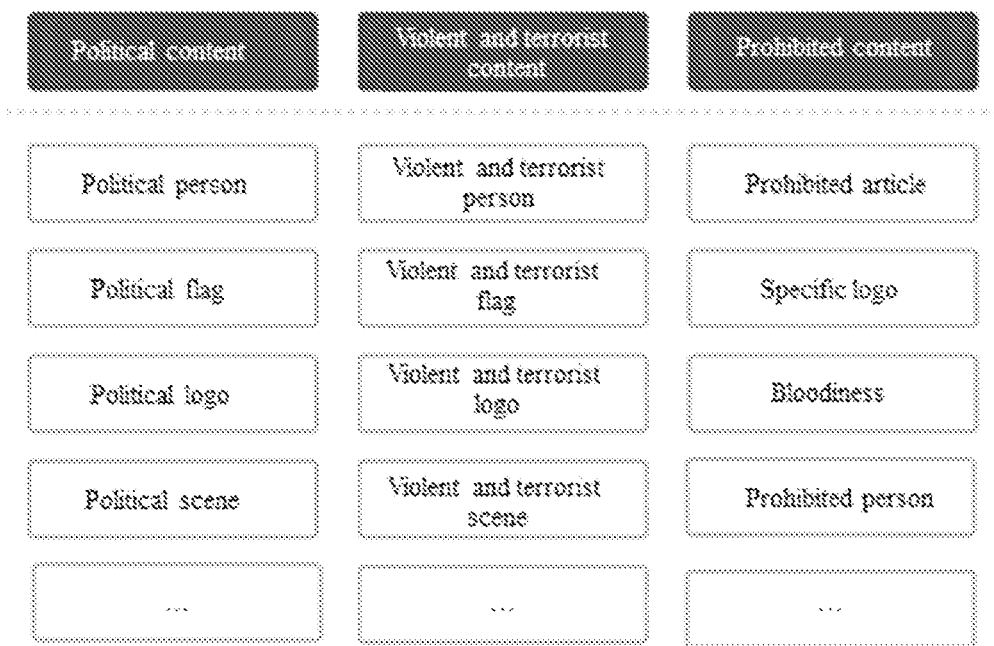
FIG. 1 is a schematic diagram of a scene applicable to a video type detection method according to an embodiment of the present application.

With the continuous development of the Internet, more and more videos appear on the Internet. At the same time, there are some security risks, for example, some terrorists spread in the Internet some objectionable videos including political contents, violent and terrorist contents, and prohibited contents and the like as shown in FIG. 1, so as to achieve certain publicity effect, which is likely to cause greater harm to social stability. Therefore, it is necessary to classify and filter these types of videos in a large amount of videos, and establish a secure network environment. Usually, such objectionable videos, for example the violent and terrorist videos, generally contain specific logos, such as one or more elements of flag, killing, bloodiness, explosion, riot, violent and terrorist persons and the like.

In existing technologies, taking the detection of violent and terrorist videos as an example, usually, for a given video, key frames are extracted from the video to obtain a series of images; and then a violent and terrorist classification model is used to classify whether each frame of image is a violent and terrorist image or not; and a logo detection model is used to detect a specific violent and terrorist logo and flag for each frame of image so as to obtain a conclusion whether each frame contains violent and terrorist elements or not. A strategy for violent and terrorist videos is to set a fixed threshold. If the times of the results containing violent and terrorist elements detected by the violent and terrorist classification model or the logo detection model exceed a specific classification threshold for the key frames in the video, the type of the video is determined as a violent and terrorist type. However, when using such a method, it is likely to make a misjudgment and the accuracy is low for short videos or other noisy videos (such as a war film, a military film, etc.). And the threshold is usually set manually, which requires a lot of time to manually adjust parameters to obtain a reasonable threshold, and thus there is the problem of inefficiency.

In consideration of the above problems, the present application provides a video type detection method, an apparatus, an electronic device and a storage medium, applied to the field of computer vision processing in the field of computer technologies. A key frame is extracted from a video whose type is to be detected; a confidence score of the key frame is determined by inputting the key frame into all (for example, M) algorithm models corresponding to the type to be detected; a confidence score of the video whose type is to be detected is determined by a fusion strategy algorithm model according to the confidence score of the key frame; and then the confidence score of the video whose type is to be detected is compared with a confidence score threshold corresponding to a certain video type, to determine whether the type of the video is said video type or not, thereby improving the accuracy of video type detection.

The video type detection method according to embodiments of the present application can be applied to detect objectionable videos (such as a violent and terrorist video, a prohibited video and the like) spread in the Internet, and can also be applied to detect the type of a video before the video is uploaded to the network, so as to prohibit objectionable videos from being uploaded to the Internet.

Figure 2:
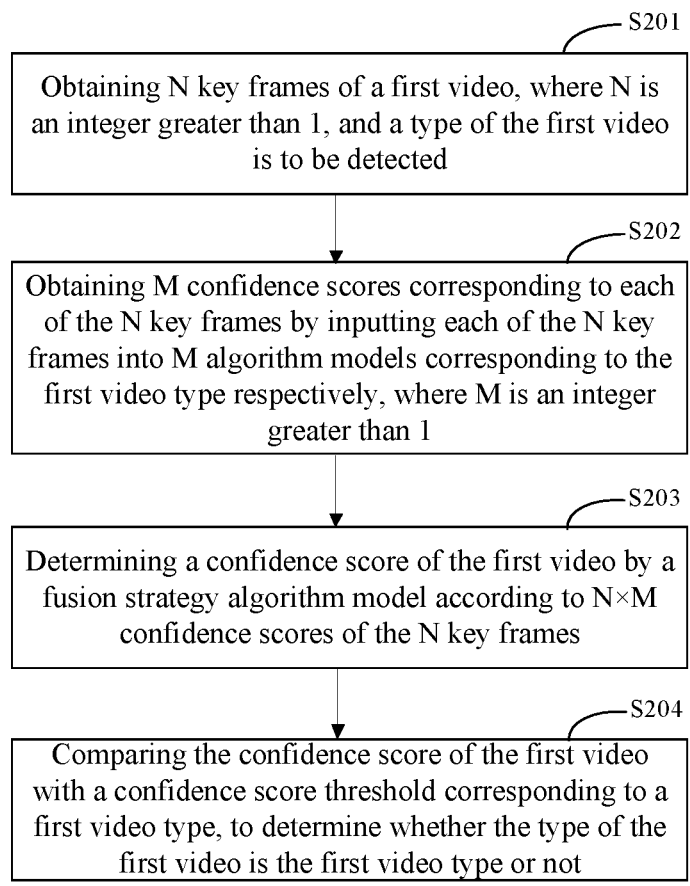
FIG. 2 is a flow diagram of a video type detection method according to an embodiment of the present application.

FIG. 2 is a flow diagram of a video type detection method according to an embodiment of the present application. As shown in FIG. 2, the method includes the following steps S201-S204.

S201: obtaining N key frames of a first video, where N is an integer greater than 1, and a type of the first video is to be detected.

In some embodiments, a fast forward moving picture experts group (FFMPEG) can be used to extract video frames from the inputted first video to obtain N key frames of the first video. In one embodiment, the FFMPEG can be used to extract frames from the first video at equal intervals, and the interval time can be adjusted as required, for example, the frames are extracted from the first video at an interval of 2 s. In one embodiment, the selection of N can be specified as required, for example, N can be 100. Frames are extracted from the first video at an interval of 2 s, until 100 key frames are extracted. In case the first video is short and extracted frames are less than 100, remaining frames can be filled with 0. For example, if frames are extracted from the first video at an interval of 2 s and only 50 frames are extracted, the remaining 50 frames are filled with 0.

S202: obtaining M confidence scores corresponding to each of the N key frames by inputting each of the N key frames into M algorithm models corresponding to the first video type respectively, where M is an integer greater than 1.

In one embodiment, the first video type may include, but is not limited to, one of the following: a violent and terrorist video type, a political video type and a prohibited video type. M algorithm models can include a classification algorithm model, a feature logo algorithm model and a feature person algorithm model. In one embodiment, the classification algorithm model can include a rough classification algorithm model and a fine classification algorithm model. In an example where the first video type is the violent and terrorist video type, M algorithm models can include 4 algorithm models: a violent and terrorist rough classification algorithm model, a violent and terrorist fine classification algorithm model, a violent and terrorist feature logo algorithm model and a violent and terrorist feature person algorithm model. Accordingly, 4 confidence scores can be obtained by inputting each of the key frames into the violent and terrorist rough classification algorithm model, the violent and terrorist fine classification algorithm model, the violent and terrorist feature logo algorithm model and the violent and terrorist feature person algorithm model respectively.

In some embodiments, each key frame is processed and normalized by each algorithm model to obtain a confidence score between [0, 1]. For example, when the key frame is inputted into the violent and terrorist rough classification algorithm model, a confidence score of [0.6, 0.4] is obtained, where 0.6 is a normal score, and 0.4 is a violent and terrorist score, and 1−normal score=1−0.6=0.4 is taken as the confidence score of the violent and terrorist rough classification for the image. The higher a violent and terrorist score, the higher the probability of the key frame being violent and terrorist. Similarly, for other algorithm models, the higher the confidence score obtained by the violent and terrorist fine classification algorithm model, the higher the probability of violent and terrorist elements (such as bloodiness, explosion, fire and the like) contained in the key frame; the higher the confidence score obtained by the violent and terrorist feature logo algorithm model, the higher the probability of a violent and terrorist logo (such as flags, etc.) contained in the key frame; the higher the confidence score obtained by the violent and terrorist feature person algorithm model, the higher the probability of a violent and terrorist person contained in the key frame.

S203: determining a confidence score of the first video by a fusion strategy algorithm model according to N×M confidence scores of the N key frames.

In one embodiment, the M confidence scores of each key frame obtained from the step S202, i.e., N×M confidence scores, can be used to determine the confidence score of the first video by the fusion strategy algorithm model. In one embodiment, the fusion strategy algorithm model may use an eXtreme Gradient Boosting (XGBOOST) classifier to determine the confidence score of the first video.

In one embodiment, corresponding weights can be assigned to the M algorithm models. Accordingly, the step 203 includes:

determining the confidence score of the first video according to N×M confidence scores of the N key frames and the corresponding weights of the M algorithm models.

The accuracy of video type detection can be further improved by assigning different weights to respective algorithm model, for example, by assigning higher weights to the feature logo algorithm model, feature person algorithm model and the like.

S204: comparing the confidence score of the first video with a confidence score threshold corresponding to the first video type, to determine whether the type of the first video is the first video type or not.

In one embodiment, when the confidence score of the first video is higher than the confidence score threshold corresponding to the first video type, it is more likely that the type of the first video is the first video type, and thus it can be determined that the type of the first video is the first video type. For example, when the first video type is a violent and terrorist video type, the first video can be determined to be a violent and terrorist video. For other types of videos, the determination manner is similar and will not be repeated here.

Figure 3:
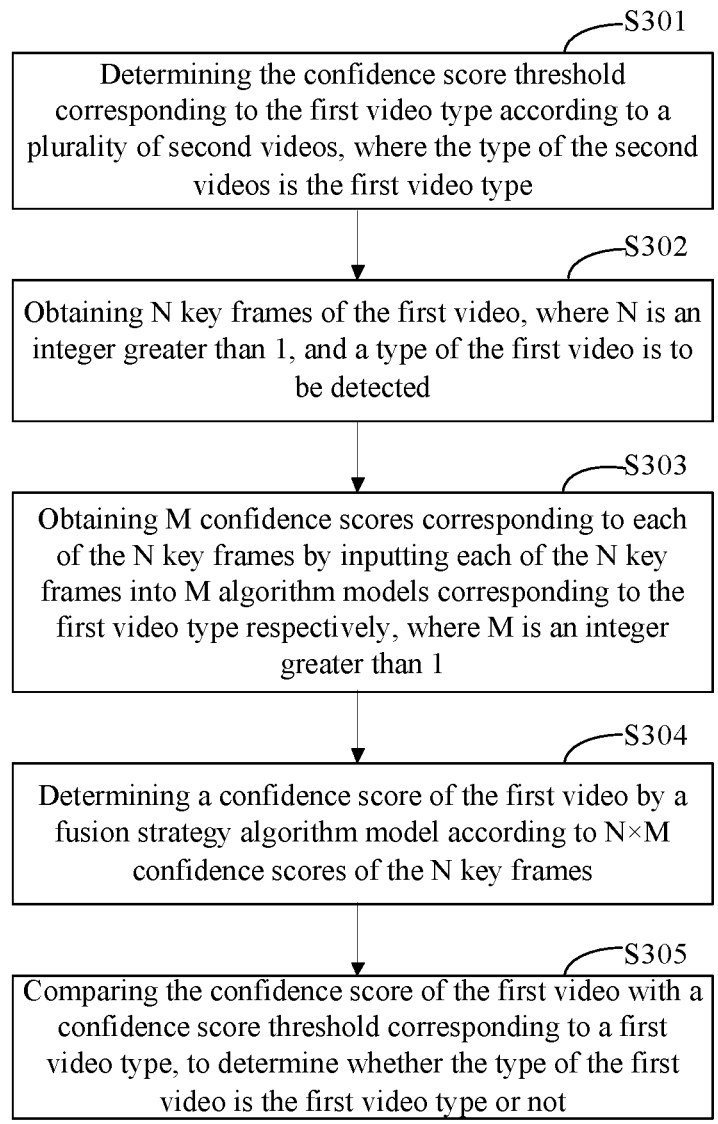
FIG. 3 is a flow diagram of a video type detection method according to another embodiment of the present application.

FIG. 3 is a flow diagram of a video type detection method according to another embodiment of the present application. As shown in FIG. 3, the method may include step 301 to step 305.

Step 301: determining the confidence score threshold corresponding to the first video type according to a plurality of second videos, where the type of the second videos is the first video type.

In one embodiment, the step 301 may include:

obtaining N key frames of each of the second videos;

obtaining M confidence scores corresponding to each of the N key frames of each of the second videos by inputting the N key frames of each of the second videos into M algorithm models corresponding to the first video type respectively; and inputting each of the second videos and N×M confidence scores corresponding thereto into the fusion strategy algorithm model for training and verification, to determine the confidence score threshold corresponding to the first video type respectively.

The manner for determining the confidence score for each of the second videos is similar to that for the first video, which can refer to the related steps mentioned above and will not be repeated here.

In one embodiment, the confidence score threshold corresponding to the first video type can be trained by labeling a plurality of second videos known as the first video type. There are N key frames for each of the second videos, and there are M confidence scores for each key frame, and thus the length of the confidence scores corresponding to N key frames of each of the second videos is fixed to be N×M; and each of the second videos and the N×M confidence scores corresponding thereto are respectively inputted into the fusion strategy algorithm model for training and verification, to determine the confidence score threshold corresponding to the first video type respectively. In one embodiment, the fusion strategy algorithm model can use XGBOOST as a classifier, and use an automatic parameter adjustment mechanism, and a plurality of second videos are inputted at multiple lines according to an input data format in which one line of feature (N×M confidence scores) is for one second video, to perform training and verification, so that a machine can automatically learn to determine the confidence score threshold for the first video type (such as, the violent and terrorist video type).

By using XGBOOST as the classifier, it can realize automatic learning to determine a confidence score threshold corresponding to a video type, thereby avoiding manual parameter adjustment, and improving the efficiency of video type detection.

Figure 4:
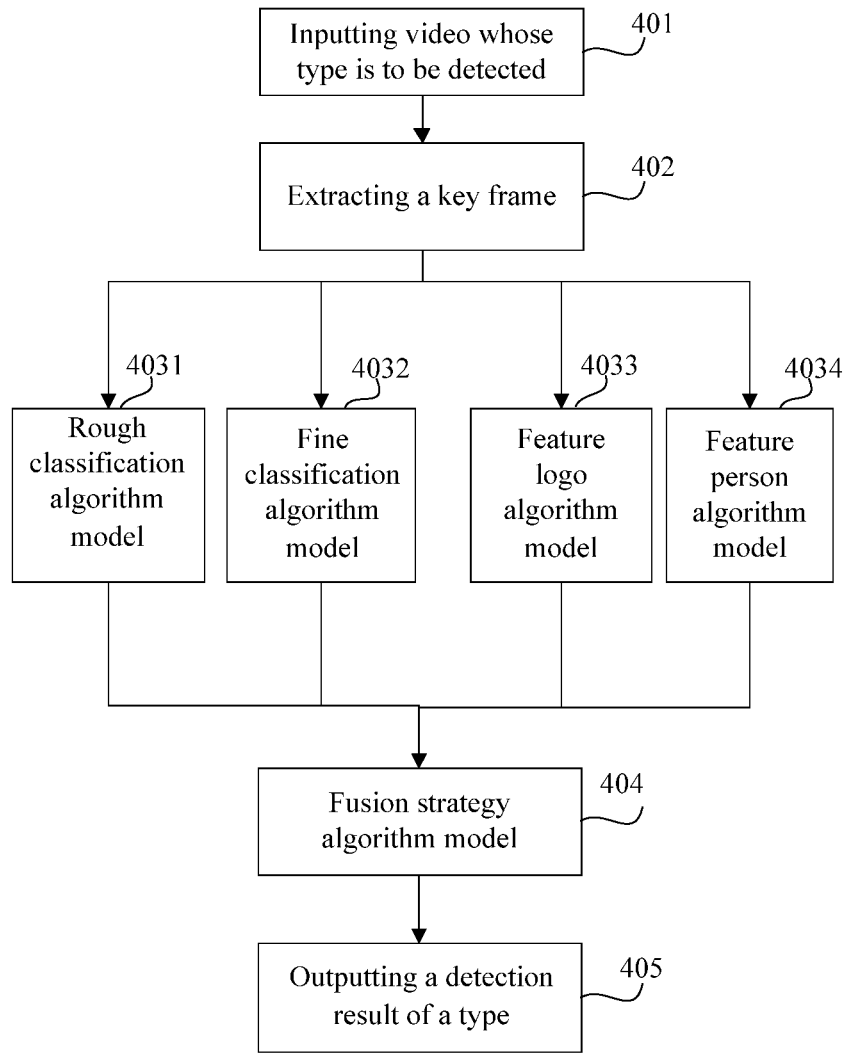
FIG. 4 is a flow diagram of an embodiment of a video type detection method according to yet another embodiment of the present application.

FIG. 4 is a flow diagram of an embodiment of a video type detection method according to yet another embodiment of the present application. As shown in FIG. 4, the method includes steps 401 to 405, in which steps 4031 to 4034 are included.

Step 401: inputting a video whose type is to be detected;

Step 402: extracting a key frame from the video inputted in step 401;

Step 4031: determining, a first confidence score of the key frame by inputting the extracted key frame into the rough classification algorithm model;

Step 4032: determining a second confidence score of the key frame by inputting the extracted key frame into the fine classification algorithm model;

Step 4033, determining a third confidence score of the key frame by inputting the extracted key frame into the feature logo algorithm model;

Step 4034, determining a fourth confidence score of the key frame by inputting the extracted key frame into the feature person algorithm model;

Step 404: determining a confidence score of the video whose type is to be detected, by inputting the first confidence score, the second confidence score, the third confidence score and the fourth confidence score into the fusion strategy algorithm model, and comparing the confidence score of the video whose type is to be detected with a corresponding threshold; and Step 405, outputting a detection result, according to a result of comparing the confidence score of the video whose type is to be detected with the corresponding threshold.

The specific implementation process can refer to the implementation method for the related steps in the above method embodiments, and will not be repeated here.

Figure 5:
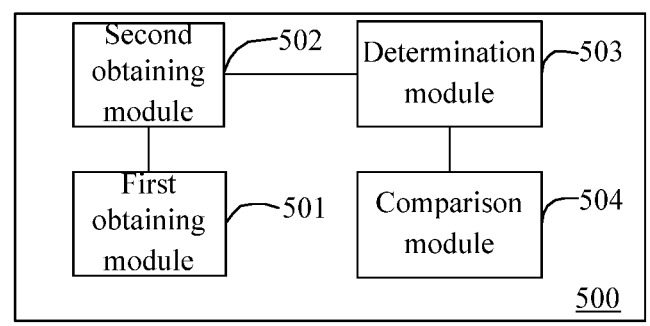
FIG. 5 is a module structure diagram of a video type detection apparatus according to an embodiment of the present application.

FIG. 5 is a module structure diagram of a video type detection apparatus according to an embodiment of the present application. As shown in FIG. 5, the video type detection apparatus 500 may include: a first obtaining module 501, a second obtaining module 502, a determination module 503 and a comparison module 504, where:

the first obtaining module 501 is configured to obtain N key frames of the first video, where N is an integer greater than 1, and a type of the first video is to be detected;

the second obtaining module 502 is configured to obtain M confidence scores corresponding to each of the N key frames by inputting each of the N key frames into M algorithm models corresponding to a first video type respectively, where M is an integer greater than 1;

the determination module 503 is configured to determine a confidence score of the first video by the fusion strategy algorithm model according to N×M confidence scores of the N key frames; and the comparison module 504 is configured to compare the confidence score of the first video with a confidence score threshold corresponding to the first video type, to determine whether the type of the first video is the first video type or not.

The second obtaining module 502 is further configured to:

determine the confidence score threshold corresponding to the first video type according to a plurality of second videos, where the type of the second videos is the first video type.

The first obtaining module 501 is further configured to obtain N key frames of each of the second videos;

the second obtaining module 502 is further configured to obtain M confidence scores corresponding to each of the N key frames of each of the second videos by inputting the N key frames of each of the second videos into M algorithm models corresponding to the first video type respectively; and the determination module 503 is further configured to input each of the second videos and N×M confidence scores corresponding thereto into the fusion strategy algorithm model for training and verification, so as to determine the confidence score threshold corresponding to the first video type respectively.

In one embodiment, an eXtreme Gradient Boosting (XG-BOOST) classifier is used as the fusion strategy algorithm model for training and verification.

In one embodiment, the first obtaining module 501 is configured to:

sample the first video at equal intervals, and extract the N key frames.

In one embodiment, the first obtaining module 501 is configured to:

sample the first video at an equal interval of 2 seconds.

In one embodiment, the determination module 503 is configured to:

assign corresponding weights to the M algorithm models; and determine the confidence score of the first video by the fusion strategy algorithm model according to the N×M confidence scores of the N key frames and the corresponding weights of the M algorithm models.

In one embodiment, the M algorithm models include: a classification algorithm model, a feature logo algorithm model and a feature person algorithm model.

In one embodiment, the classification algorithm model includes a rough classification algorithm model and a fine classification algorithm model.

In one embodiment, the first video type includes one of the following: a violent and terrorist video type, a political video type and a prohibited video type.

The implementation principle and technical effect of the video type detection apparatus provided by embodiments of the present application are similar to those of the above method embodiments, and the details will not be repeated.

According to embodiments of the application, the present application further provides an electronic device and a readable storage medium.

Figure 6:
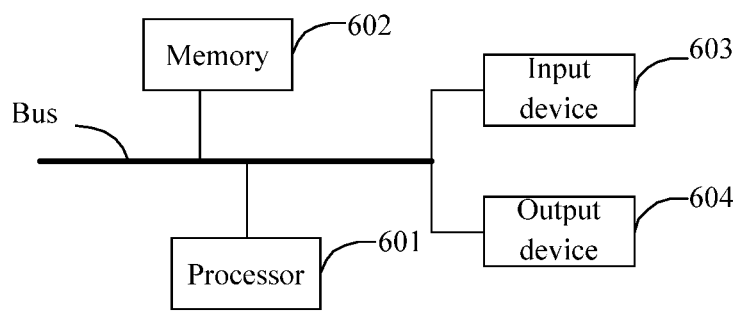
FIG. 6 is a block diagram of an electronic device for implementing a video type detection method according to an embodiment of the present application.

FIG. 6 shows a block diagram of an electronic device for the video type detection method according to embodiments of the present application. The electronic device is designed to represent various forms of digital computers, such as a laptop computer, a desktop computer, a workstation, a personal digital assistant, a server, a blade server, a mainframe computer, and other suitable computers. The electronic device may also represent various forms of mobile devices, such as a personal digital assistant, a cellular phone, a smart phone, a wearable device, and other similar computing devices. Components shown herein, connections and relationships thereof, as well as functions thereof are merely examples and are not intended to limit the present application implementation described and/or claimed herein.

As shown in FIG. 6, the electronic device includes: one or more processors 601, memory 602, and interfaces for connecting various components, including a high-speed interface and a low-speed interface. The various components are interconnected through different buses and can be installed on a common motherboard or be installed in other ways as required. The processor may process instructions executed within the electronic device, where the instructions include instructions stored in or on a memory to display graphical information of the GUI on an external input/output device (such as, a display device coupled to an interface). In other embodiments, a plurality of processors and/or a plurality of buses may be used with a plurality of memories, if required. Similarly, a plurality of electronic devices can be connected, each of which provides some of the necessary operations (for example, functions as a server array, a set of blade servers, or a multiprocessor system). In FIG. 6, one processor 601 is taken as an example.

The memory 602 is a non-transitory computer-readable storage medium provided in the present application. The memory stores instructions executable by at least one processor to cause the at least one processor to perform the video type detection method provided in the present application. The non-transitory computer-readable storage medium of the present application stores computer instructions, where the computer instructions are configured to cause a computer to perform the video type detection method provided in the present application.

The memory 602, as a non-transitory computer-readable storage medium, can be configured to store a non-transitory software program, a non-transitory computer executable program and module, such as a program instruction/module (for example, the first obtaining module 501, the second obtaining module 502, the determination module 503 and the comparison module 504 as shown in FIG. 5) corresponding to the video type detection method in the embodiment of the present application. By running the non-transitory software program, instructions and modules stored in the memory 602, the processor 601 performs various functional applications and data processing of the server, that is, realizes the video type detection method in the above method embodiments.

The memory 602 may include a program storing area and a data storing area, where the program storing area may store an operating system and application programs required by at least one function; the data storing area may store data created according to the use of the electronic device for the video type detection method, and the like. In addition, the memory 602 may include a high-speed random access memory, and may also include a non-transitory memory, such as at least one disk storage device, a flash memory device, or other non-transitory solid-state memory devices. In some embodiments, the memory 602 may optionally include memories provided remotely with respect to the processor 601, and these remote memories may be connected via a network to an electronic device for video type detection. Examples of the above-mentioned network may include, but are not limited to, Internet, an intranet, a local area network, a mobile communication network and a combination thereof.

The electronic device for the video type detection method may further include: an input device 603 and an output device 604. The processor 601, the memory 602, the input device 603 and the output device 604 may be connected via a bus or other means, and an example of a connection via the bus is shown in FIG. 6.

The input device 603 may receive inputted digital or personal information, and generate key signal input related to a user setting and functional control of the electronic device for the video type detection method. The input device, for example, is a touch screen, a keypad, a mouse, a trackpad, a touchpad, a pointer, one or more mouse buttons, a trackball, a joystick and other input devices. The output device 604 may include: a display device, an auxiliary lighting device (e.g., an LED), a tactile feedback device (e.g., a vibration motor) and the like. The display device may include, but is not limited to, a liquid crystal display (LCD), a light emitting diode (LED) display and a plasma display. In some embodiments, the display device may be a touch screen.

Various embodiments of the systems and technologies described herein may be implemented in a digital electronic circuit system, an integrated circuit system, a specialized ASIC (application specific integrated circuits), computer hardware, firmware, software, and/or a combination thereof. These various embodiments may include: being implemented in one or more computer programs, where the one or more computer programs may be executed and/or interpreted on a programmable system including at least one programmable processor, where the programmable processor may be a specialized or general-purpose programmable processor, which may receive data and instructions from a storage system, at least one input device and at least one output device and send the data and instructions to the storage system, the at least one input device and the at least one output device.

These computer programs (also referred to as programs, software, software applications, or code) include machine instructions for programmable processors and can be implemented by using a high-level procedure and/or object-oriented programming language, and/or an assembly/machine language. As used herein, the terms "machine-readable medium" and "computer-readable medium" refer to any computer program product, apparatus, and/or device (e.g., a magnetic disk, an optical disk, a memory, a programmable logic device (PLD)) for providing machine instructions and/or data to the programmable processor, and include a machine-readable medium that receives machine instructions as machine-readable signals. The term "machine-readable signal" refers to any signal configured to provide machine instructions and/or data to the programmable processor.

In order to provide interaction with an user, the systems and techniques described herein may be implemented on a computer, where the computer has: a display device (e.g., a CRT (cathode ray tube) or an LCD (liquid crystal display) monitor) for displaying information to the user; and a keyboard and a pointing device (e.g., a mouse or a trackball), through which the user can provide input to a computer. Other types of apparatuses may also be used to provide interaction with the user; for example, the feedback provided to the user may be any form of sensing feedback (such as, visual feedback, auditory feedback, or tactile feedback); and the input from the user may be received in any form (including acoustic input, voice input, or tactile input).

The systems and technologies described here may be implemented in a computing system (e.g., a data server) including a back-end component, or in a computing system (e.g., an application server) including a middleware component, or in a computing system (e.g., a user computer having a graphical user interface or a web browser, through which the user can interact with the implementation of the systems and technologies described herein) including a front-end component, or in a computing system including any combination of the background component, the middleware component, or the front-end component. The components of the system may be interconnected via digital data communication (e.g., a communication network) in any form or medium. Examples of the communication network include: a local area network (LAN), a wide area network (WAN) and Internet.

The computer system may include a client and a server. The client and the server are generally located far away from each other and usually interact with each other through a communication network. A relationship between the client and the server is generated by computer programs running on corresponding computers and having a client-server relationship between each other.

According to technical solutions of embodiments of the present application, a key frame is extracted from a video whose type is to be detected; a confidence score of the key frame is determined by all of algorithm models (such as a rough classification algorithm model, a fine classification algorithm model, a feature logo algorithm model and a feature person algorithm model) corresponding to the type to be detected; and a confidence score of the video whose type is to be detected is determined by a fusion strategy algorithm model according to the confidence score of the key frame; furthermore the confidence score of the type to be detected is compared with a confidence score threshold corresponding to a certain video type, so as to determine whether the type of the video is the video type or not, thereby improving the accuracy of video type detection.

It should be understood that steps can be reordered, added, or deleted using the various forms of processes shown above. For example, the steps recited in the present application can be performed in parallel, in sequence or in different orders, as long as expected results of the technical solution disclosed by the present application can be realized, and there is no limitation herein.

The above specific implementations do not limit the protection scope of the present application. It should be understood by those skilled in the art that various modifications, combinations, sub-combinations and substitutions may be made according to design requirements and other factors. Any modification, equivalent replacement and improvement made within the spirit and principle of the present application shall be included in the protection scope of the present application.

What is claimed is:

1. A video type detection method, comprising:
obtaining N key frames of a first video, wherein N is an integer greater than 1, and a type of the first video is to be detected;
obtaining M confidence scores corresponding to each of the N key frames by inputting each of the N key frames into M algorithm models corresponding to a first video type respectively, wherein M is an integer greater than 1, wherein for each confidence score of the M confidence scores, the confidence score corresponding to a key frame is used for representing a probability that a type of the key frame corresponds to the first video type, and the M algorithm models comprise: a classification algorithm model, a feature logo algorithm model and a feature person algorithm model;
determining a confidence score of the first video by a fusion strategy algorithm model according to N×M confidence scores of the N key frames; and
comparing the confidence score of the first video with a confidence score threshold corresponding to the first video type, to determine whether the type of the first video is the first video type or not.

2. The method according to claim 1, further comprising: determining the confidence score threshold corresponding to the first video type according to a plurality of second videos, wherein the type of the second videos is the first video type.

3. The method according to claim 2, wherein the determining the confidence score threshold corresponding to the first video type according to the plurality of second videos comprises:
obtaining N key frames of each of the second videos;
obtaining M confidence scores corresponding to each of the N key frames of each of the second videos by inputting the N key frames of each of the second videos into M algorithm models corresponding to the first video type respectively; and
inputting each of the second videos and the N×M confidence scores corresponding thereto into the fusion strategy algorithm model for training and verification, to determine the confidence score threshold corresponding to the first video type respectively.

4. The method according to claim 3, wherein an eXtreme Gradient Boosting (XGBOOST) classifier is used as the fusion strategy algorithm model for training and verification.

5. The method according to claim 1, wherein the obtaining the N key frames of the first video comprises:
sampling the first video at equal intervals, and extracting the N key frames.

6. The method according to claim 5, wherein the sampling the first video at equal intervals comprises:
sampling the first video at an equal interval of 2 seconds.

7. The method according to claim 1, further comprising:
assigning corresponding weights to the M algorithm models;
the determining the confidence score of the first video by the fusion strategy algorithm model according to the N×M confidence scores of the N key frames comprises:
determining the confidence score of the first video according to the N×M confidence scores of the N key frames and the corresponding weights of the M algorithm models.

8. The method according to claim 1, wherein the classification algorithm model comprises a rough classification algorithm model and a fine classification algorithm model.

9. The method according to claim 1, wherein the first video type comprises one of the following: a violent and terrorist video type, a political video type and a prohibited video type.

10. A video type detection apparatus, comprising:
at least one processor; and
a memory, connected with the at least one processor in communication; wherein, the memory stores instructions executable by the at least one processor, wherein the instructions are executed by the at least one processor to cause the at least one processor to:
obtain N key frames of a first video, wherein N is an integer greater than 1, and a type of the first video is to be detected;
obtain M confidence scores corresponding to each of the N key frames by inputting each of the N key frames into M algorithm models corresponding to a first video type respectively, wherein M is an integer greater than 1, wherein for each confidence score of the M confidence scores, the confidence score corresponding to a key frame is used for representing a probability that a type of the key frame corresponds to the first video type, and the M algorithm models comprise: a classification algorithm model, a feature logo algorithm model and a feature person algorithm model;
determine a confidence score of the first video by a fusion strategy algorithm model according to N×M confidence scores of the N key frames; and
compare the confidence score of the first video with a confidence score threshold corresponding to the first video type, to determine whether the type of the first video is the first video type or not.

11. The apparatus according to claim 10, wherein the at least one processor is further enabled to:
determine the confidence score threshold corresponding to the first video type according to a plurality of second videos, wherein the type of the second videos is the first video type.

12. The apparatus according to claim 11, wherein the at least one processor is further enabled to:
obtain N key frames of each of the second videos;
obtain M confidence scores corresponding to each of the N key frames of each of the second videos by inputting the N key frames of each of the second videos into M algorithm models corresponding to the first video type respectively; and
input each of the second videos and the N×M confidence scores corresponding thereto into the fusion strategy algorithm model for training and verification to determine the confidence score threshold corresponding to the first video type respectively.

13. The apparatus according to claim 12, wherein an eXtreme Gradient Boosting (XGBOOST) classifier is used as the fusion strategy algorithm model for training and verification.

14. The apparatus according to claim 10, wherein the at least one processor is further enabled to:
sample the first video at equal intervals, and extract the N key frames.

15. The apparatus according to claim 14, wherein the at least one processor is further enabled to:
sample the first video at an equal interval of 2 seconds.

16. The apparatus according to claim 10, wherein the at least one processor is further enabled to:
assign corresponding weights to the M algorithm models;
determine, by the fusion strategy algorithm model, the confidence score of the first video according to the N×M confidence scores of the N key frames and the corresponding weights of the M algorithm models.

17. The apparatus according to claim 10, wherein the classification algorithm model comprises a rough classification algorithm model and a fine classification algorithm model.

18. A non-transitory computer-readable storage medium storing computer instructions, wherein the computer instructions are configured to cause a computer to perform the method according to claim 1.

19. The method according to claim 9, wherein
when the first video type is the violent and terrorist video type, the type of the key frame corresponding to the first video type means that the type of the key frame is violent and terrorist;
when the first video type is the political video type, the type of the key frame corresponding to the first video type means that the type of the key frame is political; and
when the first video type is the prohibited video type, the type of the key frame corresponding to the first video type means that the type of the key frame is prohibited.

20. The apparatus according to claim 10, wherein
when the first video type is a violent and terrorist video type, the type of the key frame corresponding to the first video type means that the type of the key frame is violent and terrorist;
when the first video type is a political video type, the type of the key frame corresponding to the first video type means that the type of the key frame is political; and
when the first video type is a prohibited video type, the type of the key frame corresponding to the first video type means that the type of the key frame is prohibited.

* * * * *